United States Patent Office 3,314,218
Patented Apr. 18, 1967

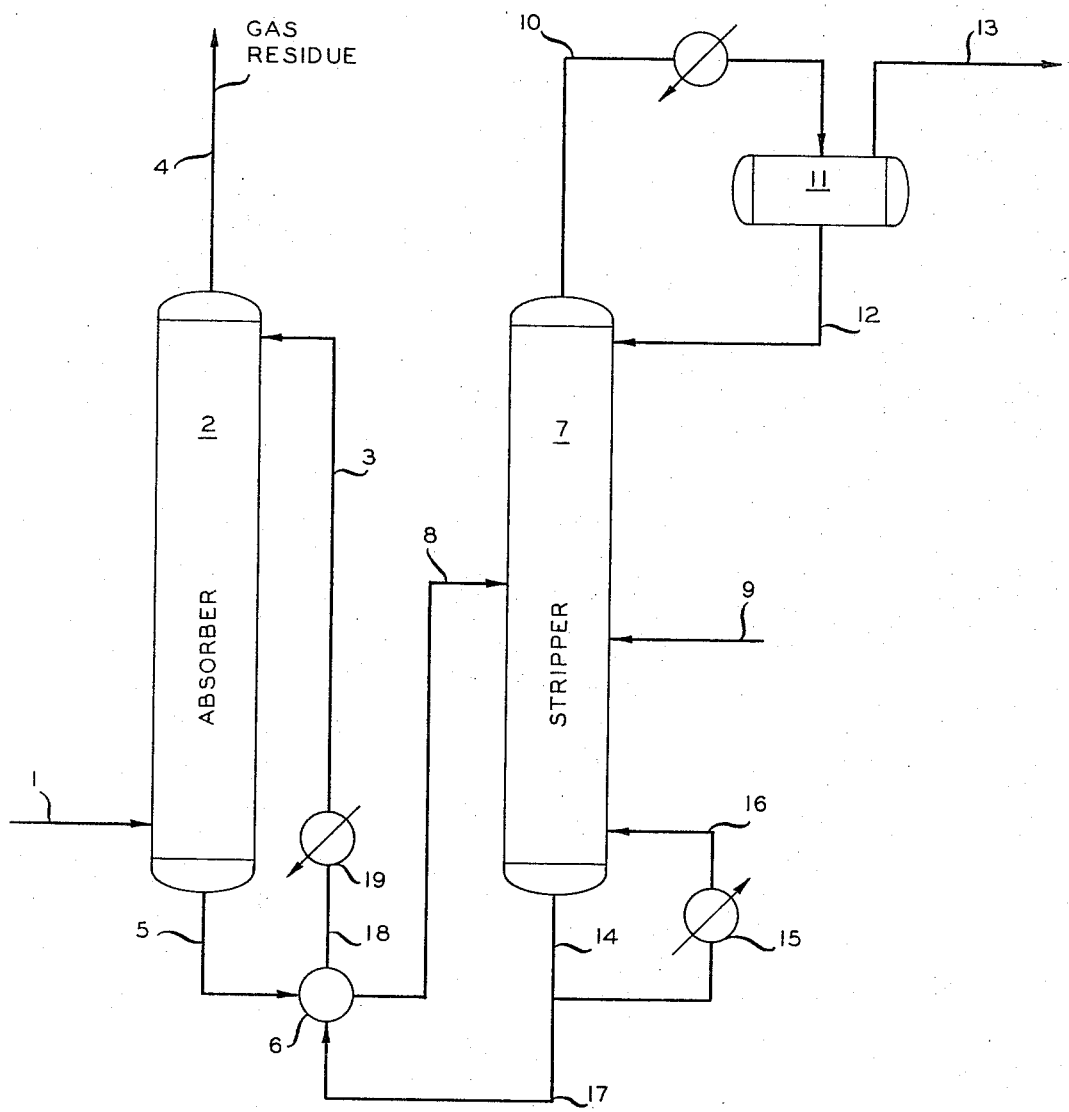

3,314,218
RECOVERY AND PURIFICATION OF
ALKYLACETYLENES
Fred M. Warzel, Bartlesville, Okla., assignor to Phillips
Petroleum Company, a corporation of Delaware
Filed Sept. 14, 1964, Ser. No. 396,189
9 Claims. (Cl. 55—53)

This invention relates to the recovery of alkylacetylenes from gases containing the same. In one of its aspects this invention relates to the recovery of alkylacetylenes or mixtures thereof with diolefins by introducing olefins into the stripping zone of the recovery process.

In recent years a great deal of interest has been shown in the production of ethylene by pyrolysis of ethane, propane, or heavier materials. Ethylene is also produced by various thermal and catalytic cracking operations. When ethylene is prepared by one of the above-described processes, alkylacetylenes are nearly always produced as byproducts. The separation of ethylene from various byproducts is well known in the art. However, there has been no satisfactory method of separating alkylacetylenes from the various byproducts to produce a relatively safe and desirable product.

Considerable interest is now being devoted to the use of certain alkylacetylenes as high energy industrial fuel gases. It has been shown that alkylacetylenes can be used as extremely economical fuels in metal cutting and welding operations, in flame-hardening operations, and other industrial operations where a gas of high heating value is required. One of the disadvantages in using the alkylacetylenes as industrial fuels is the everpresent danger of exposive decomposition when their concentrations exceed certain safe limits in a gas mixture. This explosive decomposition is sometimes spontaneous and can occur in the absence of oxygen. The danger of explosive decomposition also exists in the recovery and purification of alkylacetylenes from gaseous streams.

To produce a product containing alkylacetylenes that is desirable for use as an industrial fuel gas, it must have a very high heating value of B.t.u's per pound and a very high flame temperature. The product must also be relatively safe and inexpensive. It has been found that a product containing an alkylacetylene and a diolefin gives a very high heating value of B.t.u.'s per pound. But such a mixture decomposes with explosive violence when its concentration exceeds certain limits dependent upon temperature, pressure and composition.

It has now been discovered that a highly desirable product containing alkylacetylenes and diolefins can be obtained by introducing a gaseous olefin into the stripping zone of a gas separation unit wherein the alkylacetylene has been absorbed in a solvent and is later stripped from the solvent. It is known in the art to add a paraffinic material to the gas stripping zone of a gas separation unit wherein acetylene is recovered from a gas. Such a process could be used in the recovery of alkylacetylenes but the product obtained would be undesirable and not suited for use as an industrial gas. By using may improved process for the recovery of alkylacetylenes and mixtures of alkylacetylenes and diolefins from a gaseous stream a safe, inexpensive and highly desirable industrial gas can be obtained. In my invention a gaseous olefin is added to the gas stripping zone of a gas separation unit to serve a dual purpose. The gaseous olefin serves as a stripping gas to strip absorbed alkylacetylenes and diolefins from an absorbent. The gaseous olefin also serves as a diluent to prevent an explosive concentration of alkylacetylenes and diolefins from occurring in the gas stripper and in the recovered product. It is evident to one skilled in the art that a product obtained by my invention is much more desirable as a cutting gas than products obtained by older methods. A product obtained by using this process would be expected to contain 40 mol percent methylacetylene, 20 mol percent propadiene and 40 mol percent propylene and would have a very high flame temperature. This product is far more desirable for use as an industrial cutting gas than a product obtained from conventional separation processes wherein a paraffinic material is added to a gas stripper. A product obtained by such a conventional process could be expected to contain 40 mol percent methylacetylene, 20 mol percent propadiene and 40 mol percent propane. The flame temperature of a gas containing propylene is higher than that of a gas containing propane giving it much more desirable properties as an industrial cutting gas.

It is an object of this invention to provide a process for the recovery and purification of alkylacetylenes. It is a further object of this invention to provide an improved operation for stripping alkylacetylenes from an absorbent containing the same. It is a further object of this invention to provide an improved operation for stripping a mixture of alkylacetylene and diolefins from an absorbent containing the same.

According to this invention there is provided a method of stripping alkylacetylenes from an absorbent containing the same which comprises performing said stripping in the presence of an olefin which is gaseous under the stripping conditions of the operation.

Also, according to this invention there is provided a method of stripping a mixture of alkylacetylenes and diolefins from an absorbent containing the same which comprises performing said stripping in the presence of an olefin which is gaseous under the stripping conditions of operation.

Certain other aspects, objects and advantages of the invention will be apparent to those skilled in the art upon a careful study of this disclosure, the drawing and the appended claims.

In my invention alkylacetylenes and mixtures of alkylacetylenes and diolefins are safely separated from a stream of gases containing the same. The stream of gases is first contacted with a selected solvent in a conventional gas absorption unit. The solvent selectively absorbs the alkylacetylenes and diolefins from the stream of gases and the unabsorbed gases are removed from the system as residue gas from the absorber overhead. The solvent enriched with absorbed alkylacetylenes and diolefins is then passed to a gas stripping unit where the alkylacetylenes and diolefins are stripped from the solvent. Since high concentrations of alkylacetylenes and diolefins explosively decompose, an olefin is added to the gas stripper. The olefin acts as a stripping gas to strip the absorbed alkylacetylene and diolefin from the solvent in the gas stripping unit. It also acts as a gaseous diluent to prevent dangerous concentrations of alkylacetylenes and diolefins from occurring in the stripping unit and in the gaseous product. By sampling the feed to the absorber and determining the amount of alkylacetylene and diolefin present in the mixture, a determination may be made as to what amount of olefin must be added to the gas stripping unit to produce a product wherein the concentration of alkylacetylene and diolefin are within safe limits. Under normal operations the olefin will be added in a gaseous state at a point below the feed tray of the enriched solvent in the gas stripper. The stripper is operated at a temperature and pressure where the olefin is gaseous and where the overhead product containing alkylacetylene, olefin and diolefin, if present in the feed stream, is gaseous. The gaseous olefin raises in the gas stripper and contacts the enriched solvent and strips the alkylacetylene and diolefin from the solvent. By adding the olefin below the feed tray in the gas stripper the concentration of the alkylacetylene and diolefin will always be kept within safe operational limits within the gas stripper. A method of applying heat to the base of the gas stripper, such as a conventional reboiler, assures complete stripping of product from the solvent. Since the concentration of a particular alkylacetylene required to cause explosive decomposition or detonation in a mixture is a function of pressure, temperature, and diolefin present in said mixture, safety limits or concentrations must be determined in each individual case. As an example, a concentration of methylacetylene and propadiene of 65 mol percent is considered safe in a pressure range of up to a least 115 p.s.i.g. at a temperature range of up to 125° C. The gaseous overhead product is withdrawn from the gas stripper and can be stored in conventional gas storage containers. The stripped solvent is withdrawn from the base of the gas stripper and recycled to the gas absorber.

It is within the scope of this invention to recover methylacetylene and ethylacetylene and mixtures thereof using this improved method of recovery and purification. It is also within the scope of this invention to recover the above-named alkylacetylenes in a product mixed with diolefins to give a recovered product having a high heating value of B.t.u.'s per pound. Included in the diolefins to be recovered in the product using this improved method of recovery and purification are propadiene, butadiene and pentadiene and mixtures thereof. Included among the olefins which can be used are those which are gaseous under the conditions maintained in the stripping zone and these include propylene, butylene and pentene and mixtures thereof. It is within the scope of the invention to provide an olefin stream of varying composition. It is also within the scope of the invention to introduce such a stream at more than one place to the stripping tower or zone. In any event the olefins stream will be introduced to the stripping zone or tower in such a manner as to prevent a concentration of alkylacetylenes and diolefins from exceeding the limits wherein the mixture explosively decomposes in the absence of oxygen. Sufficient gaseous olefin must be introduced to produce a product wherein the concentration of alkylacetylene and diolefin does not exceed limits wherein the mixture explosively decomposes in the absence of oxygen.

The inventive features of my process will further be clarified by reference to the drawing, in which an alkylacetylene-containing gas is treated.

In the drawing, the figure shows diagrammatically a specific embodiment of the invention employing dimethylformamide to absorb methylacetylene and propadiene from a charge gas. The enriched dimethylformamide is passed to a stripping tower wherein propylene is added below the enriched dimethylformamide feed tray to prevent the concentration of methylacetylene and propadiene from rising above safe limits in the stripping tower. The propylene is in the gaseous state and will be added in an amount sufficient to produce an overhead product wherein the concentration of methylacetylene and propadiene does not exceed 65 mol percent. It will be evident to one skilled in the art in possession of this disclosure that other solvents can be substituted for dimethylformamide in the practice of this invention.

Referring now to the figure of the drawing, the methylacetylene and propadiene-containing gas is introduced by way of conduit 1 into an absorber 2 in which it is countercurrently contacted with dimethylformamide solvent introduced into absorber 2 by way of conduit 3. As the gas rises in absorber 2 substantially all of the methylacetylene and propadiene are absorbed into the dimethylformamide solvent. Residue gas is removed overhead via conduit 4 and is removed from the system. The temperature at the top of absorber 2 is about 110° F. at a pressure of about 255 p.s.i.a. The rich solvent stream is removed from the bottom of absorber 2 by way of conduit 5, passing in heat exchange relationship with the lean DMF solvent in heat exchanger 6. The pressure at the bottom of absorber 2 is about 260 p.s.i.a. The rich stream is then passed to the methylacetylene and propadiene stripper 7 via conduit 8. Gaseous propylene is introduced to stripper 7 via conduit 9 at a point below the entrance of conduit 8. The overhead from stripper 7, containing product methylacetylene, propadiene, and propylene passes via conduit 10 to knock-out pot 11 in which entrained DMF is removed from the gas and returned to stripper 7 via conduit 12. The temperature at the top of stripper 7 is about 110° F. at a pressure of about 180 p.s.i.a. The product gas containing propylene and not more than 65 mol percent methylacetylene and propadiene is removed via conduit 13. Lean DMF solvent is removed from stripper 7 via conduit 14. The temperature at the bottom of stripper 7 is about 350° F. at a pressure of about 185 p.s.i.a. A portion of the lean solvent is heated in reboiler 15 and returned to the stripper through conduit 16. The remaining portion passes by way of conduit 17 in heat exchange relationship with the rich DMF solvent in heat exchanger 6, as previously described, and is passed by way of conduit 18 to further heat exchange relationship in heat exchanger 19. The lean DMF solvent is then passed from heat exchanger 19 to the top of absorber 2 by way of conduit 3. It will be apparent to one skilled in the art that the temperatures and pressures shown on the drawing can be varied over wide ranges to obtain optimum operating conditions when different feed streams and products are obtained.

The following tabulation gives, by way of example, flow rates for the operational conditions which are found in FIGURE 1 of the drawing:

| Stream Number | 1 | 4 | 5 | 9 | 13 |
|---|---|---|---|---|---|
| Units, Mols/Hr.: | | | | | |
| Propane | 923 | 921 | 2 | 0.1 | 2.1 |
| Propylene | 40 | 39 | 1 | 13.8 | 14.8 |
| Propadiene | 13 | | 13 | | 13 |
| Methylacetylene | 20 | | 20 | | 20 |
| C₄ Compounds | 4 | | 4 | | 4 |

Reasonable variations and modifications are possible within the scope of the foregoing disclosure, the drawing, and the appended claims of the invention.

I claim:

1. A method for the recovery and purification of methylacetylene from a stream of gases contining methylacetylene which comprises the steps of: contacting said stream of gases with dimethylformamide in an absorption zone, passing said dimethylformamide enriched with methylacetylene to a gaseous methylacetylene stripping zone, introducing sufficient propylene into said stripping zone to produce a product wherein the concentration of methylacetylene does not exceed 65 mol percent, said stripping zone being maintained at a temperature and pressure to produce a gaseous product of methylacetylene and propylene, said propylene being introduced into said stripping zone at a point wherein it contacts said dimethylformamide enriched with methylacetylene, recovering a mixture of methylacetylene and propylene wherein the concentration of methylacetylene does not exceed 65 mol percent, recovering stripped dimethylformamide and recycling said stripped dimethylformamide to said absorption zone.

2. A method for the recovery and purification of methylacetylene and propadiene from a stream of gases containing methylacetylene and propadiene which comprises the steps of: contacting said stream of gases with dimethylformamide in an absorption zone, passing said dimethylformamide enriched with methylacetylene and propadiene to a gaseous stripping zone, introducing sufficient propylene into said stripping zone to produce a product wherein the concentration of methylacetylene and propadiene does not exceed 65 mol percent, said stripping zone being maintained at a temperature and pressure to produce a gaseous product of methylacetylene, propadiene and propylene, said propylene being introduced into said stripping zone at a point wherein it contacts said dimethylformamide enriched with methylacetylene and propadiene, recovering a mixture of methylacetylene, propadiene and propylene wherein the concentration of methylacetylene and propadiene does not exceed 65 mol percent, recovering stripped dimethylformamide and recycling said stripped dimethylformamide to said absorption zone.

3. A method for the recovery and purification of methylacetylene from a stream of gases containing methylacetylene which comprises the steps of: contacting said stream of gases with a solvent in an absorption zone, passing said solvent enriched with methylacetylene to a gaseous methylacetylene stripping zone, introducing sufficient olefin from the group consisting of propylene, butylene, pentene and mixtures thereof into said stripping zone to produce a product wherein the concentration of methylacetylene does not exceed 65 mol percent, said stripping zone being maintained at a temperature and pressure to produce a gaseous product of methylacetylene and said olefin, said olefin being introduced into said stripping zone at a point wherein it contacts said solvent enriched with methylacetylene, recovering a mixture of methylacetylene and olefin wherein the concentration of methylacetylene does not exceed 65 mol percent, recovering stripped solvent and recycling said stripped solvent to said absorption zone.

4. A method for the recovery and purification of methylacetylene and a diolefin from the group consisting of propadiene, butadiene, pentadiene and mixtures thereof from a stream of gases containing methylacetylene and said dolefin which comprises the steps of: contacting said stream of gases with a solvent in an absorption zone, passing said solvent enriched with methylacetylene and said diolefin to a gaseous methylacetylene and diolefin stripping zone, introducing sufficient olefin from the group consisting of propylene, butylene, pentene and mixtures thereof into said stripping zone to produce a product wherein the concentration of methylacetylene and said diolefin does not exceed 65 mol percent, said stripping zone being maintained at a temperature and pressure to produce a gaseous product of methylacetylene, said diolefin and said olefin, said olefin being introduced into said stripping zone at a point wherein it contacts said solvent enriched with methylacetylene and said diolefin, recovering a mixture of methylacetylene and diolefin wherein the concentration of methylacetylene and diolefin does not exceed 65 mol percent, recovering stripped solvent and recycling said stripped solvent to said absorption zone.

5. A method for the recovery of an alkylacetylene from the group consisting of methylacetylene, ethylacetylene and mixtures thereof from a gas containing the same which comprises the steps of: absorbing said alkylacetylene into a solvent, stripping said alkylacetylene from said solvent, addition of sufficient olefin from the group consisting of propylene, butylene, pentene and mixtures thereof to the stripping step to produce a product wherein the concentration of alkylacetylene is less than the amount required to support explosive decomposition under the conditions of said stripping, the conditions of said stripping being maintained at a temperature and pressure to produce a gaseous product of alkylacetylene and olefin, said olefin being introduced into said stripping step at a point wherein it contacts said solvent enriched with alkylacetylene and recovering a mixture of said alkylacetylene and said olefin wherein the concentration of said alkylacetylene is less than the amount required to support explosive decomposition of the mixture in the absence of oxygen.

6. A method for the recovery of an alkylacetylene from the group consisting of methylacetylene, ethylacetylene and mixtures thereof and a diolefin from the group consisting of propadiene, butadiene, pentadiene and mixtures thereof from a gas containing the same which comprises the steps of: absorbing said alkylacetylene and said diolefin into a solvent, stripping said alkylacetylene and said diolefin from said solvent, addition of sufficient olefin from the group consisting of propylene, butylene, pentene and mixtures thereof to the stripping step to produce a product wherein the concentration of alkylacetylene and diolefin is less than the amount required to support explosive decomposition under the conditions of said stripping, the conditions of said stripping being maintained at a temperature and pressure to produce a gaseous product of alkylacetylene, diolefin and olefin, said olefin being introduced into said stripping step at a point wherein it contacts said solvent enriched with alkylacetylene and diolefin and recovering a mixture of said alkylacetylene, said diolefin and said olefin wherein the concentration of the alkylacetylene and diolefin is less than the amount required to support explosive decomposition of the mixture in the absence of oxygen.

7. A method according to claim 4 wherein the diolefin is butadiene.

8. A method according to claim 3 wherein the olefin is butylene.

9. A method according to claim 5 wherein the alkylacetylene is ethylacetylene.

References Cited by the Examiner

UNITED STATES PATENTS

| | | | |
|---|---|---|---|
| 2,395,362 | 2/1946 | Welling | 55—65 X |
| 2,781,862 | 2/1957 | Fussman | 55—56 X |
| 3,004,629 | 10/1961 | Cottle | 55—56 |

FOREIGN PATENTS

| | | |
|---|---|---|
| 680,429 | 8/1939 | Germany. |
| 149,529 | 6/1961 | U.S.S.R. |

REUBEN FRIEDMAN, *Primary Examiner.*

D. M. RIESS, *Assistant Examiner.*